United States Patent
Ur-Rehman et al.

(10) Patent No.: US 11,617,375 B2
(45) Date of Patent: *Apr. 4, 2023

(54) METHODS FOR MAKING SHELF-STABLE CULTURED DAIRY PRODUCTS

(71) Applicant: fairlife, LLC, Chicago, IL (US)

(72) Inventors: Shakeel Ur-Rehman, Naperville, IL (US); Brandon Kopesky, Chicago, IL (US); Tim Doelman, Glencoe, IL (US)

(73) Assignee: fairlife, LLC, Chicago, IL (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/182,320

(22) Filed: Feb. 23, 2021

(65) Prior Publication Data

US 2021/0204556 A1 Jul. 8, 2021

Related U.S. Application Data

(63) Continuation of application No. 16/502,204, filed on Jul. 3, 2019, now Pat. No. 10,952,450, which is a continuation of application No. 15/162,649, filed on May 24, 2016, now Pat. No. 10,390,541.

(60) Provisional application No. 62/170,883, filed on Jun. 4, 2015.

(51) Int. Cl.

| | | |
|---|---|---|
| *A23C 9/123* | (2006.01) | |
| *A23L 33/20* | (2016.01) | |
| *A23C 3/00* | (2006.01) | |
| *A23C 3/02* | (2006.01) | |
| *A23C 9/12* | (2006.01) | |
| *A23C 9/13* | (2006.01) | |
| *A23C 9/142* | (2006.01) | |
| *B65B 55/12* | (2006.01) | |

(52) U.S. Cl.
CPC ............ *A23C 9/1234* (2013.01); *A23C 3/005* (2013.01); *A23C 3/02* (2013.01); *A23C 9/123* (2013.01); *A23C 9/1226* (2013.01); *A23C 9/13* (2013.01); *A23C 9/1322* (2013.01); *A23C 9/142* (2013.01); *A23C 9/1422* (2013.01); *A23L 33/20* (2016.08); *B65B 55/12* (2013.01); *A23C 2210/202* (2013.01); *A23C 2220/20* (2013.01); *A23C 2240/10* (2013.01); *A23C 2270/00* (2013.01)

(58) Field of Classification Search
CPC ......... A23C 9/1234; A23C 3/005; A23C 3/02; A23C 9/1226; A23C 9/123; A23C 9/13; A23C 9/1322; A23C 9/142; A23C 9/1422; A23C 2210/202; A23C 2220/20; A23C 2240/10; A23C 2270/00; A23L 33/20; B65B 55/12
USPC ...... 426/34, 42, 43, 520, 521, 580, 583, 522
See application file for complete search history.

(56) References Cited

U.S. PATENT DOCUMENTS

| | | |
|---|---|---|
| 6,881,428 B2 | 4/2005 | Lange |
| 7,169,428 B2 | 1/2007 | Dunker et al. |
| 7,829,130 B2 | 11/2010 | Tossavainen et al. |
| 10,390,541 B2 | 8/2019 | Ur-Rehman et al. |
| 10,952,450 B2 | 3/2021 | Ur-Rehman et al. |
| 2003/0194468 A1 | 10/2003 | Konkoly et al. |
| 2007/0166447 A1 | 7/2007 | Ur-Rehman et al. |
| 2008/0286410 A1 | 11/2008 | Richmond et al. |
| 2009/0304864 A1 | 12/2009 | Marchal et al. |
| 2010/0297294 A1 | 11/2010 | Ur-Rehman et al. |
| 2010/0303958 A1 | 12/2010 | Ur-Rehman et al. |
| 2011/0117243 A1 | 5/2011 | Ur-Rehman et al. |
| 2011/0206806 A1 | 8/2011 | Ur-Rehman et al. |
| 2011/0244077 A1 | 10/2011 | Belferman et al. |
| 2013/0309353 A1 | 11/2013 | Ur-Rehman et al. |
| 2013/0309354 A1 | 11/2013 | Ur-Rehman et al. |
| 2014/0113043 A1 | 4/2014 | Ur-Rehman et al. |

FOREIGN PATENT DOCUMENTS

| | | |
|---|---|---|
| EP | 0 061 946 | 10/1982 |
| EP | 2 149 305 | 2/2010 |
| FR | 2 224 096 | 10/1974 |
| WO | WO 2013/169205 | 11/2013 |
| WO | WO 2014/095543 | 6/2014 |

OTHER PUBLICATIONS

International Search Report and the Written Opinion of the International Searching Authority in PCT/US2016/033942 dated Aug. 8, 2016, 13 pages.

*Primary Examiner* — Leslie A Wong
(74) *Attorney, Agent, or Firm* — Merchant & Gould P.C.

(57) ABSTRACT

Disclosed are processes for producing cultured dairy products, such as yogurt, that are shelf-stable without refrigeration. Such processes can include contacting a milk base having from 0.5 to 1.9 wt. % milk sugar with a lactic acid bacteria culture and aseptically packaging in a container, followed by storage under conditions suitable to result in a pH of less than 4.7.

25 Claims, 2 Drawing Sheets

METHODS FOR MAKING SHELF-STABLE CULTURED DAIRY PRODUCTS

REFERENCE TO RELATED APPLICATION

This application is a continuation application of U.S. patent application Ser. No. 16/502,204, filed on Jul. 3, 2019, now U.S. Pat. No. 10,952,450, which is a continuation application of U.S. patent application Ser. No. 15/162,649, filed on May 24, 2016, now U.S. Pat. No. 10,390,541, which claims the benefit of U.S. Provisional Application Ser. No. 62/170,883, filed on Jun. 4, 2015, the disclosures of which are incorporated herein by reference in their entirety.

BACKGROUND OF THE INVENTION

The traditional yogurt manufacturing process involves heating of milk at temperatures of 85-95° C. for 5-10 min, and then cooling the heated milk to warm temperatures (21-45° C.). Safe and harmless lactic acid bacterial cultures are then added to the warm milk. The culture/warm milk mixtures are then filled into cups or transferred to fermentation tanks. The warm milk/culture mixtures are then incubated at warm temperatures for 2-24 hours until a coagulum is obtained, or a pH of 4.6 of the milk is obtained. The yogurt set in cups is then cooled to below 10° C. The yogurt set in fermentation tanks is stirred and cooled to below 10° C., and then filled into cups as drinkable yogurt or stirred yogurt. The whey in yogurt set in fermentation tanks can be strained by passing over filters, or spinning by centrifugal devices resulting in concentrated/strained or Greek yogurt. Flavors or sweeteners can be added before heating the milk or post-fermentation, while fruits are often added post-fermentation. These resultant yogurt products are stored at refrigeration temperatures during distribution, display, and in homes.

At present, the available shelf-stable yogurts and other cultured dairy products are manufactured by sterilizing in a post-fermentation step, which kills the live beneficial bacteria. It would be beneficial to produce cultured dairy products, such as yogurt, kefir, and sour cream, which could be distributed and stored under ambient or non-refrigerated conditions without diminishing the shelf-life and beneficial qualities of the cultured dairy products. Accordingly, it is to these ends that the present invention is directed.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Processes for producing a cultured dairy product (e.g., a shelf-stable cultured dairy product, such as yogurt) are disclosed herein. In accordance with an aspect of the present invention, one such process can comprise contacting a sterilized reduced sugar milk base with a lactic acid bacteria culture and aseptically packaging in a container, wherein the sterilized reduced sugar milk base comprises from about 0.5 to about 1.9 wt. % milk sugar; and storing under conditions sufficient to reduce the pH of the contents in the container to less than about 4.7 to produce the cultured dairy product.

In another aspect, a process for producing a cultured dairy product is disclosed, and in this aspect, the process can comprise (a) subjecting a milk product comprising from about 0.5 to about 1.9 wt. % milk sugar to ultra-high temperature (UHT) sterilization to form a sterilized milk product, (b) cooling the sterilized milk product to a temperature less than or equal to about 50° C. to form a sterilized reduced sugar milk base, (c) contacting the milk base with a lactic acid bacteria culture and aseptically packaging in a container, and (d) storing under conditions sufficient to reduce the pH of the contents in the container to less than about 4.7 to produce the cultured dairy product.

Unexpectedly, and beneficially, these processes can result in a shelf-stable cultured dairy product, in particular, a yogurt or other cultured dairy product that is shelf-stable without refrigeration for up to six months or more. Additionally, the shelf-stable cultured dairy product has live lactic acid bacteria or live active cultures (i.e., beneficial bacteria).

Both the foregoing summary and the following detailed description provide examples and are explanatory only. Accordingly, the foregoing summary and the following detailed description should not be considered to be restrictive. Further, features or variations can be provided in addition to those set forth herein. For example, certain aspects can be directed to various feature combinations and sub-combinations described in the detailed description.

DEFINITIONS

Figure 1:
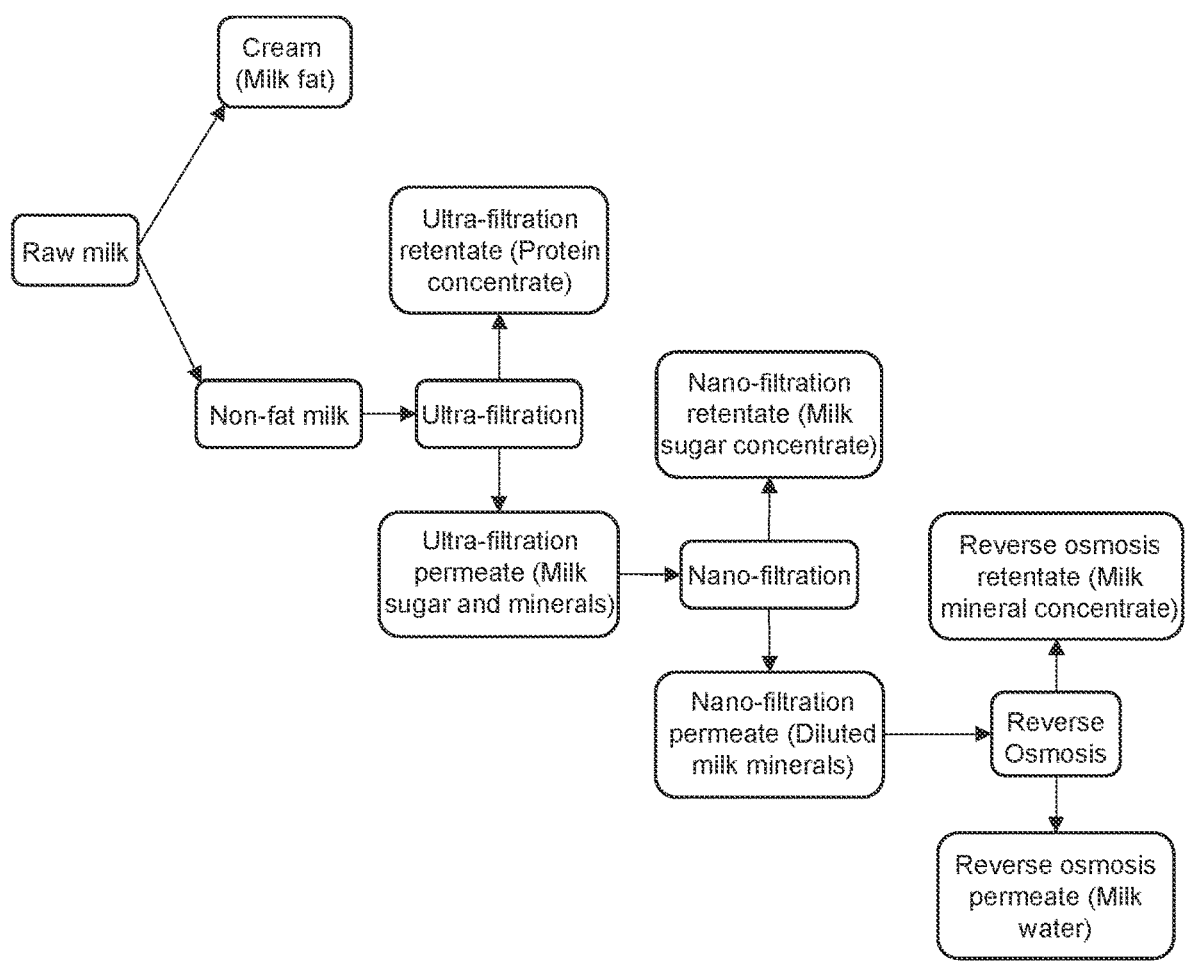
FIG. 1 presents a schematic flow diagram of a membrane filtration process for producing a milk base or milk product consistent with aspects of this invention.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter can be described such that, within particular aspects, a combination of different features can be envisioned. For each and every aspect and each and every feature disclosed herein, all combinations that do not detrimentally affect the designs, compositions, or processes described herein are contemplated and can be interchanged, with or without explicit description of the particular combination. Accordingly, unless explicitly recited otherwise, any aspect or feature disclosed herein can be combined to describe inventive designs, compositions, or processes consistent with the present disclosure.

While compositions and processes are described herein in terms of "comprising" various components or steps, the compositions and methods can also "consist essentially of" or "consist of" the various components or steps, unless stated otherwise.

The terms "a," "an," and "the" are intended to include plural alternatives, e.g., at least one, unless otherwise specified. For instance, the disclosure of "a lactic acid bacteria culture" is meant to encompass one, or mixtures or combinations of more than one, lactic acid bacteria culture, unless otherwise specified.

The terms "contact product," "contacting," and the like, are used herein to describe compositions and processes wherein the components are contacted together in any order, in any manner, and for any length of time, unless otherwise specified. For example, the components can be contacted by blending or mixing. Further, unless otherwise specified, the contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Similarly, the term "contacting" is used herein to refer to materials which can be blended, mixed, slurried, dissolved, reacted, treated, or otherwise contacted or combined in some other manner or by any suitable technique. Hence, "contacting" two or more components can result in a mixture, a reaction product, a reaction mixture, etc.

Cultured dairy products include, but are not limited to, yogurt products, kefir products, sour cream products, and the like, as would be recognized by those of skill in the art.

Although any methods and materials similar or equivalent to those described herein can be used in the practice or testing of the invention, the typical methods and materials are herein described.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the protein content of the milk product and the milk base can be in certain ranges in various aspects of this invention. By a disclosure that the protein content can be in a range from about 1 to about 15 wt. %, the intent is to recite that the protein content can be any protein content within the range and, for example, can be equal to about 1, about 2, about 3, about 4, about 5, about 6, about 7, about 8, about 9, about 10, about 11, about 12, about 13, about 14, or about 15 wt. %. Additionally, the protein content can be within any range from about 1 to about 15 wt. % (for example, from about 3 to about 11 wt. %), and this also includes any combination of ranges between about 1 and about 15 wt. % (for example, the protein content can be in a range from 2 to about 6 wt. % or from about 10 to about 15 wt. %). Likewise, all other ranges disclosed herein should be interpreted in a manner similar to this example.

DETAILED DESCRIPTION OF THE INVENTION

Processes for producing cultured dairy products are disclosed and described herein. These processes can be used to produce, for example, cultured dairy products, such as yogurt, that are shelf-stable without refrigeration for relatively long periods of time. This results in benefits in terms of transportation (non-refrigerated tucks), warehousing and display, and overall cost.

In one aspect, a process to produce a cultured dairy product is provided, and in this aspect, the process can comprise (or consist essentially of, or consist of) (i) providing a sterilized reduced sugar milk base comprising from about 0.5 to about 1.9 wt. % milk sugar, (ii) contacting the milk base with a lactic acid bacteria culture and aseptically packaging in a container, and (iii) storing under conditions sufficient to reduce the pH of the contents in the container to less than about 4.7 to produce the cultured dairy product. In another aspect, a process to produce a cultured dairy product is provided, and in this aspect, the process can comprise (or consist essentially of, or consist of) (a) subjecting a milk product comprising from about 0.5 to about 1.9 wt. % milk sugar to ultra-high temperature (UHT) sterilization to form a sterilized milk product, (b) cooling the sterilized milk product to a temperature less than or equal to about 50° C. to form a sterilized reduced sugar milk base. (c) contacting the milk base with a lactic acid bacteria culture and aseptically packaging in a container, and (d) storing under conditions sufficient to reduce the pH of the contents in the container to less than about 4.7 to produce the cultured dairy product. As would be recognized by those of skill in the art, a sterilized milk product (or milk base) also may be referred to as a pasteurized milk product (or milk base), and UHT sterilization also may be referred to as UHT pasteurization.

Generally, the features of the processes (e.g., the type and characteristics of the milk product or milk base, the amount and type of the lactic acid bacteria culture, the conditions of UHT sterilization, the conditions under which the contents of the containers are stored, among others) are independently described herein and these features can be combined in any combination to further describe the disclosed processes. Moreover, other process steps can be conducted before, during, and/or after any of the steps listed in the disclosed processes, unless stated otherwise. Additionally, the resultant cultured dairy products (e.g., shelf-stable yogurt products, ready for consumption) produced in accordance with any of the disclosed processes are within the scope of this disclosure and are encompassed herein.

The milk product and the sterilized reduced sugar milk base can have any suitable amounts of milk sugar, protein, and fat. For example, the milk product and sterilized reduced sugar milk base independently can have from about 0.5 to about 1.9 wt. % milk sugar. In some aspects, the milk product and sterilized reduced sugar milk base independently can have from about 0.7 to about 1.9 wt. %, from about 0.7 to about 1.8 wt. %, from about 1 to about 1.8 wt. %, from about 0.5 to about 1.7 wt. %, from about 0.7 to about 1.7 wt. %, from about 1 to about 1.5 wt. %, from about 0.9 to about 1.6 wt. %, or from about 1.3 to about 1.6 wt. % milk sugar. Other appropriate ranges for the amount of milk sugar in the milk product and/or in the sterilized reduced sugar milk base are readily apparent from this disclosure. Moreover, the "milk sugar" can be in any form, for instance, hydrolyzed, un-hydrolyzed, isomerized, and the like. Moreover, "milk sugar" is also meant to encompass glucose/galactose, such as can be produced by the treatment of lactose with lactase enzyme, as would be recognized by one of skill in the art Generally, the protein content of the milk product and the sterilized reduced sugar milk base are not particularly limited. In one aspect, the milk product and sterilized reduced sugar milk base independently can have from about 1 to about 15 wt. % protein, from about 1 to about 10 wt. % protein, or from about 2 to about 15 wt. % protein. In another aspect, the milk product and sterilized reduced sugar milk base independently can have from about 3 to about 12 wt. % protein, or from about 3 to about 11 wt. % protein. In yet another aspect, the milk product and sterilized reduced sugar milk base independently can have from about 2 to about 7 wt. % protein, or from about 2 to about 6 wt. % protein. Other appropriate ranges for the amount of protein in the milk product and/or in the sterilized reduced sugar milk base are readily apparent from this disclosure.

The fat content of the milk product and the sterilized reduced sugar milk base often can range from "fat-free" (less than about 0.5 wt. %, and often less than about 0.1 wt. %) to about 10-20 wt. %. Typical ranges for the fat content of the milk product and sterilized reduced sugar milk base independently can include, but are not limited to, from 0 to about 12 wt. % fat, from 0 to about 6 wt. % fat, from about 0.1 to about 20 wt. % fat, from about 0.1 to about 6 wt. % fat, from about 1 to about 12 wt. % fat, from about 3 to about 12 wt. % fat, from about 2 to about 6 wt. % fat, or from about 3 to about 6 wt. % fat. Other appropriate ranges for the amount of fat in the milk product and/or in the sterilized reduced sugar milk base are readily apparent from this disclosure.

The sterilized reduced sugar milk base comprising from about 0.5 to about 1.9 wt. % milk sugar (or the milk product comprising from about 0.5 to about 1.9 wt. % milk sugar) can be produced by any technique known to one of skill in the art. For example, and not to be limited thereto, the milk base or milk product having about 0.5-1.9 wt. % milk sugar can be produced by a membrane filtration process to achieve the desired milk sugar content (and protein and fat contents), or alternatively, by a process comprising mixing milk powder, protein powder, lactose powder, and water, to achieve the desired milk sugar content (and protein and fat contents). FIG. 1 illustrates a representative flow diagram of a membrane filtration process that can be used to fractionate raw milk and produce a milk base comprising from about 0.5 to about 1.9 wt. % milk sugar (or a milk product comprising from about 0.5 to about 1.9 wt. % milk sugar). The fractionated components shown in FIG. 1 can then be mixed together to obtain a milk base or a milk product having, for example, a fat content of 1-10 wt. %, a protein content of 1-10 wt. %, a mineral content of 0.2-3 wt. %, and a milk sugar content of 0.5-1.9 wt. %.

Consistent with aspects of this invention, the sterilized reduced sugar milk base contacting steps in the processes disclosed herein can be conducted at any suitable conditions, for instance, any suitable aseptic conditions (i.e., sterile conditions). A tetra flexidose system or other in-line aseptic filler system can be used. In some aspects, the milk base and any suitable lactic acid bacteria culture can be contacted and aseptically packaged in a container (filled and sealed) by mixing the milk base and the lactic acid bacteria culture, and then filling the container and sealing under aseptic conditions. Alternatively, the milk base can be fed to the container, followed by the lactic acid bacteria culture, and then sealed under aseptic conditions. Other suitable techniques for contacting the milk base with the lactic acid bacteria culture and aseptically packaging in a container can be utilized, as would be recognized by those of skill in the art.

Any suitable container can be used, such as might be used for the distribution and/or sale of yogurt and other cultured dairy products in a retail outlet. Illustrative and non-limiting examples of typical containers include a cup, a bottle, a bag, or a pouch, and the like. The container can be made from any suitable material, such as glass, metal, plastics, and the like, as well as combinations thereof.

The amount and type of the lactic acid bacteria culture used can vary depending upon the desired attributes of the final cultured dairy product as well as the characteristics of the sterilized reduced sugar milk base. While not being limited thereto, the amount of the lactic acid bacteria culture can range from about 0.0001 to about 2 wt. %, from about 0.0005 to about 0.05 wt. %, from about 0.0001 to about 0.01 wt. %, or from about 0.0005 to about 0.01 wt. %, based on the weight of the milk base. Other appropriate ranges for the amount of the lactic acid bacteria culture added to the sterilized reduced sugar milk base are readily apparent from this disclosure.

The form of the lactic acid bacteria culture is not particularly limited; the lactic acid bacteria culture can be bulk, freeze dried, or frozen, and mixtures or combinations can be used as well. Typical lactic acid bacteria cultures that can be used include, but are not limited to, *Lactobacillus bulgaricus, Streptococcus thermophilus, Lactobacillus acidophillus, Lactobacillus casei, Lactococcus lactis, Lactococcus crenoris, Latobacillus plantuarum, Bifidobacteriurm, Leuconostoc*, and the like, as well as any combination thereof.

In further aspects of this invention, any of the contacting steps disclosed herein can include contacting the milk base, the lactic acid bacteria culture, and a suitable ingredient and aseptically packaging in the container. Non-limiting examples of such ingredients often used in producing the final cultured dairy product (e.g. a yogurt product) can include a sweetener, a flavorant, a preservative (e.g., to prevent yeast or mold growth), a stabilizer, an emulsifier, a prebiotic substance, a special probiotic bacteria, a vitamin, a mineral, an omega 3 fatty acid, a phyto-sterol, an antioxidant, or a colorant, and the like, as well as any mixture or combination thereof.

After the "contacting" step, the processes disclosed herein include a step of storing under conditions sufficient to reduce the pH of the contents in the container to less than about 4.7 to produce the cultured dairy product. Generally, the pH during this storage step decreases to a pH level below about 4.7, and the cultured dairy product is suitable for consumption. In some aspects, the pH can be less than about 4.65, less than about 4.6, less than about 4.55, or less than about 4.5. In other aspects, for example, the pH can be in a range from about 3.2 to about 4.7, from about 3.8 to about 4.7, from about 4 to about 4.65, from about 4.1 to about 4.65, from about 3.2 to about 4.6, from about 4 to about 4.6, from about 4.1 to about 4.6, from about 4.2 to about 4.7, from about 4.3 to about 4.6, from about 4.4 to about 4.6, from about 3.5 to about 4.6, from about 3.5 to about 4.5, from about 3.9 to about 4.4, or from about 4 to about 4.35. Other appropriate ranges for the pH of the cultured dairy product are readily apparent from this disclosure.

The "storing" step comprises storing under conditions sufficient to reduce the pH of the contents in the container to less than about 4.7 to produce the cultured dairy product, and storing under conditions sufficient comprises any suitable temperature and time conditions, for example, to allow the pH of the cultured dairy to decrease and reach a final pH value below about 4.7. Such conditions can include, but are not limited to, from about 5° C. to about 50° C. for at least about 2 hours, from about 10° C. to about 40° C. for from about 1 hour to about 3 weeks, from about 15° C. to about 30° C. for from about 2 hours to about 1 week (or 2 weeks), and the like. These time periods do not include the time when the product is in distribution (which can last for weeks or months), rather, these time periods are for the time for the pH to fall within any of the ranges disclosed herein and to equilibrate at a pH value.

The viscosity of the cultured dairy product can vary depending upon the type of cultured dairy product that is desired, e.g., drinkable yogurt versus non-drinkable yogurt, sour cream, etc. Thus, a wide range of suitable viscosities (at 25° C., centipoise) can be expected. For instance, the cultured dairy product can have a viscosity in a range from about 50 to about 1,000,000 cP; alternatively, from about 500 to about 100,000 cP; alternatively, from about 500 to about 2000 cP; or alternatively, from about 150 to about 1500 cP. Other appropriate ranges for the viscosity of the cultured dairy product are readily apparent from this disclosure.

The cultured dairy products produced herein and in accordance with the disclosed processes can be subjected to long term storage under ambient or non-refrigerated conditions, and the cultured dairy product can still be of acceptable quality, without spoiling. Unexpectedly, and beneficially, the cultured dairy product can be shelf-stable without refrigeration over a wide range of temperature and time conditions, such as from about 10° C. to about 35° C. for from about 2 to about 365 days, from about 15° C. to about 30° C. for from about 7 to about 180 days, from about 20° C. to about 25° C. for from about 14 to about 180 days, or from about 20° C. to about 25° C. for at least about 14 days, and the like. Other appropriate storage time and temperature conditions under which the cultured dairy product is shelf-stable are readily apparent from this disclosure.

In some aspects of this invention, the cultured dairy product can be produced by a process comprising (a) subjecting a milk product comprising from about 0.5 to about 1.9 wt. % milk sugar to ultra-high temperature (UHT) sterilization to form a sterilized milk product, (b) cooling the sterilized milk product to a temperature less than or equal to about 50° C. to form a sterilized reduced sugar milk base, (c) contacting the milk base with a lactic acid bacteria culture and aseptically packaging in a container, and (d) storing under conditions sufficient to reduce the pH of the contents in the container to less than about 4.7 to produce the cultured dairy product. In step (a), the milk product can be subjected to ultra-high temperature (UHT) sterilization (also referred to in the art as UHT pasteurization), which refers to the generally high temperature treatment of the milk product for a relatively short time period. UHT sterilization can be conducted at a variety of suitable temperature and time conditions, as would be recognized by those of skill in the art. Representative and non-limiting examples of UHT conditions include a temperature in a range from about 130° C. to about 150° C. for a time period of from about 1 to about 15 sec. a temperature in a range from about 130° C. to about 150° C. for a time period of from about 2 to about 4 sec, a temperature in a range from about 135° C. to about 145° C. for a time period of from about 1 to about 10 sec, or a temperature in a range from about 135° C. to about 145° C. for a time period of from about 2 to about 5 sec, and the like. Other appropriate UHT sterilization temperature and time conditions are readily apparent from this disclosure.

This invention is not limited by the method or equipment used for performing the UHT sterilization process. Any suitable UHT sterilization technique can be employed, such as indirect steam injection, direct steam injection, direct steam infusion, indirect heating, direct heating, a hybrid of direct and indirect heating, and the like. The sterilization process also can be a batch sterilization process, such as at 121° C. for 20-30 minutes, or an equivalent. Moreover, combinations of these techniques can be employed, if desired. Any suitable sterilization system can be used, such as filter sterilization by microfiltration or by ultraviolet irradiation, high pressure or by ohmic heating, cavitation or by ultra-sonification, and the like.

After the UHT sterilization step, the sterilized milk product is cooled to a temperature less than or equal to about 50° C. in step (b) to form the sterilized reduced sugar milk base. In some aspects, the sterilized milk product is cooled in step (b) to a temperature of less than or equal to about 45° C., less than or equal to about 40° C., or less than or equal to about 35°. In other aspects, the sterilized milk product is cooled in step (b) to a temperature in a range from about 5° C. to about 50° C., in a range from about 5° C. to about 40° C., in a range from about 8° C. to about 45° C., in a range from about 10° C. to about 30° C., in a range from about 20° C. to about 45° C., in a range from about 15° C. to about 40° C., or in a range from about 20° C. to about 40° C., and the like. Other appropriate cooling temperatures are readily apparent from this disclosure.

Figure 2:
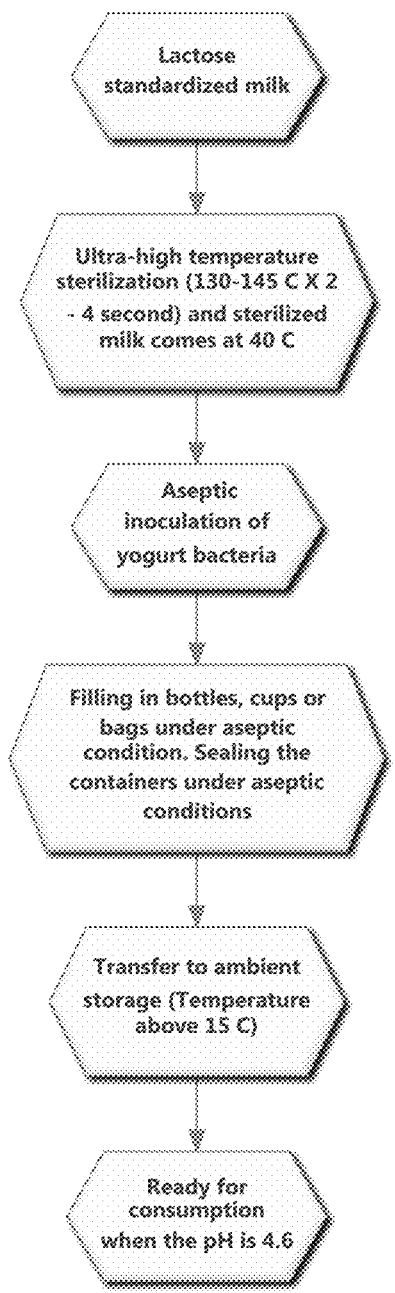
FIG. 2 presents a schematic flow diagram of a process for producing a yogurt product consistent with aspects of this invention.

An illustrative and non-limiting example of a suitable process for producing a cultured dairy product, such as yogurt, consistent with aspects of this invention is shown in FIG. 2. First, a lactose standardized milk product having a desired amount of milk sugar (e.g., 0.7-1.7 wt. %) is subjected to UHT sterilization, for example, at 130-145° C. for 2-4 seconds, and the sterilized milk product is then cooled to 40°. The resulting milk base is then aseptically contacted with a suitable bacteria or culture, and filled and sealed in a suitable container, such as a bottle, cup, or bag. The container and its contents are then stored at ambient or non-refrigerated conditions, such as above 15° C., and the pH decreases during storage to a pH value of less than 4.7. In FIG. 2, the yogurt product is ready for consumption when the pH has dropped to 4.6, or less.

Consistent with aspects of this invention, the lactic acid bacteria acts on the milk sugar, converting it into lactic acid, which results in a decrease in the pH of the milk base. When the pH of the milk reaches approximately 4.6, the isoelectric point of the most abundant protein occurring in milk (casein). At the isoelectric point, net charges on caseins become zero, and they coagulate and result in formation of curd or coagulum under quiescent conditions.

In accordance with aspects of this invention, the substrate or nutrient for the growth of lactic acid bacteria is limited. The milk sugar, nutrient for lactic acid bacteria, in the milk intended for yogurt and cultured dairy manufacture is standardized in a specific range by mixing the components of milk as shown in FIG. 1, or other suitable technique. Generally, the milk sugar level is selected in such a way that it supports growth of bacteria to produce enough lactic acid (e.g., to result in a pH below 4.7) as required for the yogurt or other cultured dairy product formation, but not for over acidification (e.g., where the pH is too low).

Again, while not wishing to be bound by theory, the activity of lactic acid bacteria is controlled to obtain a uniform quality of the yogurt or other cultured dairy product in terms of acidity and number of bacteria. The resultant cultured dairy product can be stored at ambient temperature, as no more significant fermentation occurs due to limited nutrients for the culture/bacteria to act on. The acidity present in the cultured dairy product can act as a preservative to give a long shelf-life to the cultured dairy product at ambient temperature conditions.

Thus, an advantage of the present invention is that there is no need to have incubation rooms at temperatures of 30-40° C., or maintaining 30-40° C. temperatures of milk in fermentation tanks. Moreover, there is no need to cool the cultured dairy product from 30-40° C. to refrigeration conditions of 8-10° C. or less. The elimination of incubation rom and warm temperature tanks, which is followed by subsequent cooling, can result in considerable energy and cost savings.

Further, the cultured dairy product can contain live lactic acid bacteria or live active cultures, often ranging in an amount from about 10,000,000 cfu/g to about 3,000,000,000 cfu/g. In some aspects, the cultured dairy product, such as a yogurt product, can contain from about 10,000,000 cfu/g to about 2,000,000,000 cfu/g, from about 10,000,000 cfu/g to about 1,000,000,000 cfu/g, from about 15,000,000 cfu % g to about 3,000,000,000 cfu/g, or from about 15,000,000 cfu/g to about 1,000,000,000 cfu/g, of live bacteria or live active cultures.

Examples

The invention is further illustrated by the following examples, which are not to be construed in any way as imposing limitations to the scope of this invention. Various other aspects, modifications, and equivalents thereof which, after reading the description herein, can suggest themselves to one of ordinary skill in the art without departing from the spirit of the present invention or the scope of the appended claims.

Table I summarizes certain characteristics of two aseptic drinkable yogurt products (Examples 1-2) with live and active cultures that were produced. The target yogurt product for Example 1 after storage/aging was a pH of 4.5, 5 wt. % solids, 0.09 wt. % fat, and 3 wt. % protein, from a starting milk product having approximately 1.44 wt. % milk sugar and 0.52 wt. % minerals. The milk product was prepared from milk components to result in the component amounts shown in Table I. The milk product was subjected to UHT sterilization at a preheat temperature of 85° C., a final temperature of 143° C. for 3 seconds, and at a pressure of 17.2 MPa. After cooling the sterilized milk product to 21° C., the sterilized milk base was inoculated with freeze dried lactic acid bacteria culture (a mixture of *lactobacillus bulgaricus, streptococcus thermophiles*, and *Lactobacillus acidophilus*) at 10 mg of culture per liter of milk base, and aseptically packaged in pre-sterilized Nalgene containers. The containers were stored at 22-35° C. The pH of the yogurt product was monitored for 5, 6, 7, and 16 days after the addition of the yogurt culture to the milk base and aseptic packaging. As shown in Table I, the pH of the yogurt product of Example 1 decreased to 4.36 at 7 days, and equilibrated at 4.17 at 16 days. Example 2 was produced similarly to that of Example 1, except for the target yogurt characteristics and the starting milk product components, including a starting milk sugar content of approximately 1.88 wt. %. As shown in Table I, the pH of the yogurt product of Example 2 decreased to 4.37 at 7 days, and equilibrated at 4.09 at 16 days.

The yogurt products of Examples 1-2 after 16 days were taste tested by five individuals, all of whom agreed that the yogurt products had a clean, fresh yogurt flavor. The amounts of live bacteria in the yogurt products of Examples 1-2 after 20 days at 30° C. were 33,000,000 cfu/g and 11,000,000 cfu/g, respectively.

Table II summarizes certain characteristics of a yogurt product (Example 3) with live and active cultures that was produced. The starting milk product before UHT sterilization was prepared from milk components to result in the component amounts shown in Table II. Pectin (a stabilizer) was added to the milk product, which was then subjected to UHT sterilization using direct heating (pre-heat 85° C., final heat at 143° C. for 3 seconds) and a pressure of 17.2 MPa.

After UHT, the sterilized milk base was cooled to 21° C., and then aseptically fed into 1-liter pre-sterilized Nalgene bottles. Next, the freeze dried culture (9.47 mg culture per 1000 grams of milk base) was added under sterile conditions to the contents in the bottles, and the bottles were sealed/capped under sterile conditions. The lactic acid bacteria culture was in freeze dried form, and was a mixture of *lactobacillus bulgaricus, streptococcus thermophiles*, and *Lactobacillus acidophilus*. The bottles containing the yogurt product were stored at 30° C.

The pH of the yogurt product of Example 3 and certain component amounts (e.g., fat, milk sugar) were monitored for 5 and 16 days after the addition of the yogurt culture to the milk base and aseptic packaging. As shown in Table H, the pH of the yogurt product of Example 3 decreased to 4.38 at 5 days, and equilibrated at 4.08 at 16 days. The viscosity of the yogurt product of Example 3 was 95 cP at 20° C.

TABLE I

Yogurt Examples 1-2.

|  | pH | Solids Wt. % | Fat Wt. % | Protein Wt. % | Milk Sugar Wt. % | Minerals Wt. % |
|---|---|---|---|---|---|---|
| Example 1 — Target | 4.5 | 5.0 | 0.09 | 3.0 | — | — |
| Starting milk product | 6.81 | 5.2 | 0.13 | 3.0 | 1.44 | 0.52 |
| 5 days | 5.03 | — | — | — | — | — |
| 6 days | 5.03 | — | — | — | — | — |
| 7 days | 4.36 | — | — | — | — | — |
| 16 days | 4.17 | 4.8 | 0.15 | 2.8 | — | — |
| Example 2 — Target | 4.50 | 5.5 | 0.09 | 3.0 | — | — |
| Starting milk product | 6.75 | 5.8 | 0.15 | 3.0 | 1.88 | 0.54 |
| 5 days | 4.81 | — | — | — | — | — |
| 6 days | 4.85 | — | — | — | — | — |
| 7 days | 4.37 | — | — | — | — | — |
| 16 days | 4.09 | 5.4 | 0.14 | 2.8 | — | — |

Yogurt Examples 3.

|  | pH | Solids Wt. % | Fat Wt. % | Protein Wt. % | Milk Sugar Wt. % | Viscosity at 20° C. (cp) |
|---|---|---|---|---|---|---|
| Before UHT | 6.60 | 5.7 | 0.17 | 3.01 | 1.5 | — |
| 5 days | 4.38 | 5.6 | 0.17 | 3.01 | < 0.5 | — |
| 16 days | 4.08 | 5.6 | 0.17 | 3.10 | < 0.5 | 95.4 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects typically are described as "comprising" but, alternatively, can "consist essentially of" or "consist of" unless specifically stated otherwise):

Aspect 1. A process to produce a cultured dairy product, the process comprising:

(i) providing a sterilized reduced sugar milk base comprising from about 0.5 to about 1.9 wt. % milk sugar;

(ii) contacting the milk base with a lactic acid bacteria culture and aseptically packaging in a container; and (iii) storing under conditions sufficient to reduce the pH of the contents in the container to less than about 4.7 to produce the cultured dairy product.

Aspect 2. A process to produce a cultured dairy product, the process comprising:

(a) subjecting a milk product comprising from about 0.5 to about 1.9 wt. % milk sugar to ultra-high temperature (UHT) sterilization to form a sterilized milk product;

(b) cooling the sterilized milk product to a temperature less than or equal to about 50° C. to form a sterilized reduced sugar milk base:

(c) contacting the milk base with a lactic acid bacteria culture and aseptically packaging in a container; and (d) storing under conditions sufficient to reduce the pH of the contents in the container to less than about 4.7 to produce the cultured dairy product.

Aspect 3. The process of aspect 1 or 2, wherein the milk base (or milk product) comprises any suitable amount of milk sugar, or an amount of milk sugar in any range disclosed herein. e.g., from about 0.7 to about 1.7 wt. %, from about 1 to about 1.5 wt. %, from about 1.3 to about 1.6 wt. %, etc.

Aspect 4. The process of any one of aspects 1-3, wherein the milk base (or milk product) comprises any suitable amount of protein, or an amount of protein in any range disclosed herein, e.g., from about 1 to about 15 wt. %, from about 3 to about 11 wt. %, from about 2 to about 7 wt. %, etc.

Aspect 5. The process of any one of aspects 1-4, wherein the milk base (or milk product) comprises any suitable amount of fat, or an amount of fat in any range disclosed herein, e.g., from about 0.1 to about 20 wt. %, from 0 to about 12 wt. %, from about 2 to about 6 wt. %, from about 3 to about 12 wt. %, etc.

Aspect 6. The process of any one of aspects 2-5, wherein the UHT sterilization is conducted at any suitable temperature and time conditions, or is conducted at any temperature and for any period of time disclosed herein, e.g., from about 130° C. to about 150° C. for from about 1 to about 15 sec, from about 130° C. to about 150° C. for from about 2 to about 4 see, from about 135° C. to about 145° C. for from about 1 to about 10 sec, from about 135° C. to about 145° C. for from about 2 to about 5 see, etc.

Aspect 7. The process of any one of aspects 2-6, wherein the UHT sterilization is conducted using any suitable technique, or any technique disclosed herein. e.g., indirect heating, direct heating, direct steam injection, direct steam infusion, a hybrid of direct and indirect heating, etc.

Aspect 8. The process of any one of aspects 2-7, wherein the sterilized milk product is cooled in step (b) to any suitable temperature, or a temperature in any range disclosed herein, e.g., less than or equal to about 45° C., less than or equal to about 40° C., less than or equal to about 35° C., in a range from about 5° C. to about 50° C., in a range from about 5° C. to about 40° C., in a range from about 8° C. to about 45° C., in a range from about 10° C. to about 30° C., in a range from about 15° C. to about 40° C., in a range from about 20° C. to about 40° C., etc.

Aspect 9. The process of any one of aspects 1-8, wherein the amount of the lactic acid bacteria culture in step (ii) and/or step (c) is any suitable amount, or an amount in any range disclosed herein, e.g., from about 0.0001 to about 2 wt. %, from about 0.0005 to about 0.05 wt. %, etc., based on the milk base.

Aspect 10. The process of any one of aspects 1-9, wherein the lactic acid bacteria culture is in any suitable form, or any form disclosed herein, e.g., bulk, freeze dried, frozen, etc., as well as combinations thereof.

Aspect 11. The process of any one of aspects 1-10, wherein the lactic acid bacteria culture comprises any suitable culture, or any culture disclosed herein, e.g., *Lactobacillus bulgaricus, Streptococcus thermophilus, Lactobacillus acidophillus, Lactobacillus casei, Lactococcus lactis, Lactococcus cremoris, Lactobacillus plantarum, Bifidobacterium, Leuconostoc*, etc., as well as combinations thereof.

Aspect 12. The process of any one of aspects 1-11, wherein the milk base is contacted with the lactic acid bacteria culture and any suitable ingredient, or any ingredient disclosed herein e.g., a sweetener, a flavorant, a preservative, a stabilizer, an emulsifier, a prebiotic substance, a special probiotic bacteria, a vitamin. a mineral, an omega 3 fatty acid, a phyto-sterol, an antioxidant, a colorant, etc., as well as combinations thereof.

Aspect 13. The process of any one of aspects 1-12, wherein the container is any suitable container, or any container disclosed herein, e.g., a cup, a bottle, a bag, a pouch, etc.

Aspect 14. The process of any one of aspects 1-13, wherein the pH is reduced in step (iii) and/or step (d) to any suitable pH, or to a pH in any range disclosed herein, e.g., less than about 4.65, less than about 4.6, in a range from about 3.2 to about 4.7, in a range from about 3.8 to about 4.7, in a range from about 4 to about 4.65, in a range from about 3.2 to about 4.6, in a range from about 4.4 to about 4.6, etc.

Aspect 15. The process of any one of aspects 1-14, wherein storing under conditions sufficient comprises any suitable temperature and time conditions, or at any temperature and for any period of time disclosed herein, e.g., from about 5° C. to about 50° C. for at least about 2 hours, from about 10° C. to about 40° C. for from about 1 hour to about 3 weeks, from about 15° C. to about 30° C. for from about 2 hours to about 1 week (or 2 weeks), etc.

Aspect 16. The process of any one of aspects 1-5, wherein the cultured dairy product has any suitable viscosity, or a viscosity in any range disclosed herein, e.g., from about 50 to about 1,000,000 cP, from about 500 to about 100,000 cP, from about 500 to about 2000 cP, from about 150 to about 1500 cP, etc.

Aspect 17. The process of any one of aspects 1-16, wherein the sterilized reduced sugar milk base comprising from about 0.5 to about 1.9 wt. % milk sugar (or the milk product comprising from about 0.5 to about 1.9 wt. % milk sugar) is produced by any suitable process, or any process disclosed herein, e.g., a membrane filtration process, a process comprising mixing milk powder, protein powder, lactose powder, and water, etc.

Aspect 18. The process of any one of aspects 1-17, wherein the cultured dairy product is shelf-stable without refrigeration at any suitable temperature and time conditions, or at any temperature and for any period of time disclosed herein, e.g., from about 10° C. to about 35° C. for from about 2 to about 365 days, from about 15° C. to about 30° C. for from about 7 to about 180 days, from about 20° C. to about 25° C. for from about 14 to about 180 days, from about 20° C. to about 25° C. for at least about 14 days, etc.

Aspect 19. A cultured dairy product (e.g., yogurt, kefir, or sour cream) prepared by the process of any one of aspects 1-18.

Aspect 20. The cultured dairy product of aspect 19, wherein the cultured dairy product contains live bacteria or live active cultures (e.g., from about 10,000.000 cfu/g to about 3,000,000,000 cfu/g).

We claim:

1. A process to produce a yogurt product, the process comprising:
    (a) subjecting a milk product comprising from about 1 to about 1.8 wt. % lactose to ultra-high temperature (UHT) sterilization to form a sterilized milk product;
    (b) cooling the sterilized milk product to a temperature in a range from about 8° C. to about 45° C. to form a sterilized reduced sugar milk base;

(c) contacting the milk base with a lactic acid bacteria culture and aseptically packaging in a container, wherein the lactic acid bacteria culture comprises *Lactobacillus bulgaricus, Streptococcus thermophilus, Lactobacillus casei, Lactococcus lactis, Lactococcus cremoris, Latobacillus plantarum*, or any combination thereof; and (d) storing under conditions sufficient to reduce the pH of the contents in the container to within a range from about 4.1 to about 4.6 to produce the yogurt product; wherein the yogurt product contains from about 15,000,000 cfu/g to about 1,000,000,000 cfu/g of live bacteria or live active cultures.

2. The process of claim 1, wherein the milk product comprises from about 1 to about 1.5 wt. % lactose.

3. The process of claim 2, wherein the milk product comprises:
from about 2 to about 7 wt. % protein; and
from 0 to about 6 wt. % fat.

4. The process of claim 3, wherein the sterilized milk product in step (b) is cooled to a temperature in a range from about 15° C. to about 40° C. to form the sterilized reduced sugar milk base.

5. The process of claim 1, wherein the milk product comprises from about 1.3 to about 1.6 wt. % lactose.

6. The process of claim 1, wherein:
the amount of the lactic acid bacteria culture is from about 0.0001 to about 2 wt. %, based on the weight of the milk base; and
the lactic acid bacteria culture comprises *Lactobacillus bulgaricus, Streptococcus thermophilus*, or a combination thereof.

7. The process of claim 1, wherein in step (c), the milk base is contacted with the lactic acid bacteria culture and an ingredient comprising a vitamin, a mineral, or any combination thereof.

8. The process of claim 1, wherein the UHT sterilization is conducted at a temperature in a range from about 130° C. to about 150° C.

9. The process of claim 1, wherein storing under conditions sufficient comprises a temperature in a range from about 10° C. to about 40° C. for a time period in a range from about 1 hour to about 2 weeks.

10. The process of claim 1, wherein the pH is reduced in step (d) to within a range from about 4.3 to about 4.6.

11. The process of claim 10, wherein the milk product comprises:
from about 2 to about 7 wt. % protein; and
from 0 to about 6 wt. % fat.

12. The process of claim 11, wherein the yogurt product is shelf-stable without refrigeration at a temperature in a range from about 15° C. to about 30° C. for a time period in a range from about 7 to about 180 days.

13. A process to produce a yogurt product, the process comprising:

contacting a sterilized reduced sugar milk base with a lactic acid bacteria culture and aseptically packaging in a container, wherein the sterilized reduced sugar milk base comprises from about 1 to about 1.8 wt. % lactose, and wherein the lactic acid bacteria culture comprises *Lactobacillus bulgaricus, Streptococcus thermophilus, Lactobacillus casei, Lactococcus lactis, Lactococcus cremoris, Latobacillus plantarum*, or any combination thereof; and storing under conditions sufficient to reduce the pH of the contents in the container to within a range from about 4.1 to about 4.6 to produce the yogurt product; wherein the yogurt product contains from about 15,000,000 cfu/g to about 1,000,000,000 cfu/g of live bacteria or live active cultures.

14. The process of claim 13, wherein the amount of the lactic acid bacteria culture is from about 0.0001 to about 2 wt. %, based on the weight of the sterilized reduced sugar milk base.

15. The process of claim 14, wherein the yogurt product is shelf-stable without refrigeration at a temperature in a range from about 15° C. to about 30° C. for a time period in a range from about 7 to about 180 days.

16. The process of claim 13, wherein the sterilized reduced sugar milk base comprises:
from about 1 to about 1.5 wt. % lactose;
from about 2 to about 7 wt. % protein; and
from 0 to about 6 wt. % fat.

17. The process of claim 16, wherein the pH is reduced to within a range from about 4.3 to about 4.6.

18. The process of claim 16, wherein storing under conditions sufficient comprises a temperature in a range from about 10° C. to about 40° C. for a time period in a range from about 1 hour to about 2 weeks.

19. The process of claim 13, wherein the lactic acid bacteria culture comprises *Lactobacillus bulgaricus, Streptococcus thermophilus*, or a combination thereof.

20. The process of claim 19, wherein the sterilized reduced sugar milk base comprises:
from about 1.3 to about 1.6 wt. % lactose;
from about 2 to about 7 wt. % protein; and
from 0 to about 6 wt. % fat.

21. The process of claim 20, wherein the pH is reduced to within a range from about 4.3 to about 4.6.

22. The process of claim 20, wherein the yogurt product is shelf-stable without refrigeration at a temperature in a range from about 15° C. to about 30° C. for a time period in a range from about 7 to about 180 days.

23. The process of claim 2, wherein the milk product comprises from about 2 to about 7 wt. % protein.

24. The process of claim 5, wherein the milk product comprises from about 2 to about 7 wt. % protein.

25. The process of claim 13, wherein the sterilized reduced sugar milk base comprises from about 2 to about 7 wt. % protein.

* * * * *